US008484237B2

(12) United States Patent
Uemura et al.

(10) Patent No.: US 8,484,237 B2
(45) Date of Patent: Jul. 9, 2013

(54) TERMINAL, WEB APPLICATION OPERATING METHOD AND PROGRAM

(75) Inventors: Kazuyoshi Uemura, Tokyo (JP); Masanobu Nakamura, Tokyo (JP)

(73) Assignee: NEC Corporation, Tokyo (JP)

(*) Notice: Subject to any disclaimer, the term of this patent is extended or adjusted under 35 U.S.C. 154(b) by 83 days.

(21) Appl. No.: 12/922,057

(22) PCT Filed: Mar. 18, 2009

(86) PCT No.: PCT/JP2009/055341
§ 371 (c)(1),
(2), (4) Date: Sep. 10, 2010

(87) PCT Pub. No.: WO2009/133727
PCT Pub. Date: Nov. 5, 2009

(65) Prior Publication Data
US 2011/0035362 A1 Feb. 10, 2011

(30) Foreign Application Priority Data
Apr. 30, 2008 (JP) .................................. 2008-118435

(51) Int. Cl.
*G06F 17/30* (2006.01)
(52) U.S. Cl.
USPC ......................................... 707/763; 707/724
(58) Field of Classification Search
USPC ................................................. 707/763, 724
See application file for complete search history.

(56) References Cited

U.S. PATENT DOCUMENTS 6,668,053 B1 * 12/2003 Doleac et al. ................. 379/243
6,704,779 B1    3/2004 Germscheid et al.
7,464,120 B1 * 12/2008 Doleac et al. ........................ 1/1
2005/0251425 A1 * 11/2005 Fox .................................. 705/3
2009/0313667 A1 * 12/2009 Zhao et al. ...................... 725/93

FOREIGN PATENT DOCUMENTS

| CN | 101022538 A | 8/2007 |
|---|---|---|
| JP | 2001184472 A | 7/2001 |
| JP | 2002197069 A | 7/2002 |
| JP | 2003067527 A | 3/2003 |
| JP | 2004086890 A | 3/2004 |
| JP | 2006331194 A | 12/2006 |
| JP | 4047770 B | 2/2008 |
| TW | 486636 | 5/2002 |

OTHER PUBLICATIONS

International Search Report for PCT/JP2009/055341 mailed Jun. 30, 2009.
K. Ogino, "Imasara Kikenai Internet Shokyu Guide IE & OE no Joshiki Dai 84 Kai", PC fan, Mainichi Communications Inc., vol. 13, No. 18, Aug. 1, 2006, pp. 98-99.
Taiwanese Office Action for TW098113879 dated on Feb. 4, 2013 with English Translation.

* cited by examiner

*Primary Examiner* — Baoquoc N To

(57) ABSTRACT

A terminal stores in a storage section content distributed from a server and a data access power for deleting a service that differ from a service to which the content belongs in association with each other. The terminal determines, when the stored content requests the deletion of the differing service that is indicated by the statement contained in the content, whether or not the content and the data access power are stored in the storage section in association with each other. When the terminal has determined that the content that requested the deletion of the differing service and the data access power are stored in the storage section in association with each other, the terminal deletes content that belongs to the differing service from the storage section.

9 Claims, 10 Drawing Sheets

Fig.6a service provider registration power information 
IF1 (Fig. 5)

| power | content whose execution is permitted (URL) |
|---|---|
| service provider registration power PR1 | URL of primary service SV-P |
| service provider registration power PR1 | URL of individual service SV-1 |

Fig.6b service registration power information 
IF2 (Fig. 5)

| power | content whose execution is permitted |
|---|---|
| service registration power PR2 | URL of primary service SV-P |
| service registration power PR2 | URL of individual service SV-1 |
| ⋮ | ⋮ |
| service registration power PR2 | URL of individual service SV-N | content utilization power information    IF3-1 (Fig. 5)

data access power information    IF4-1 (Fig. 5)

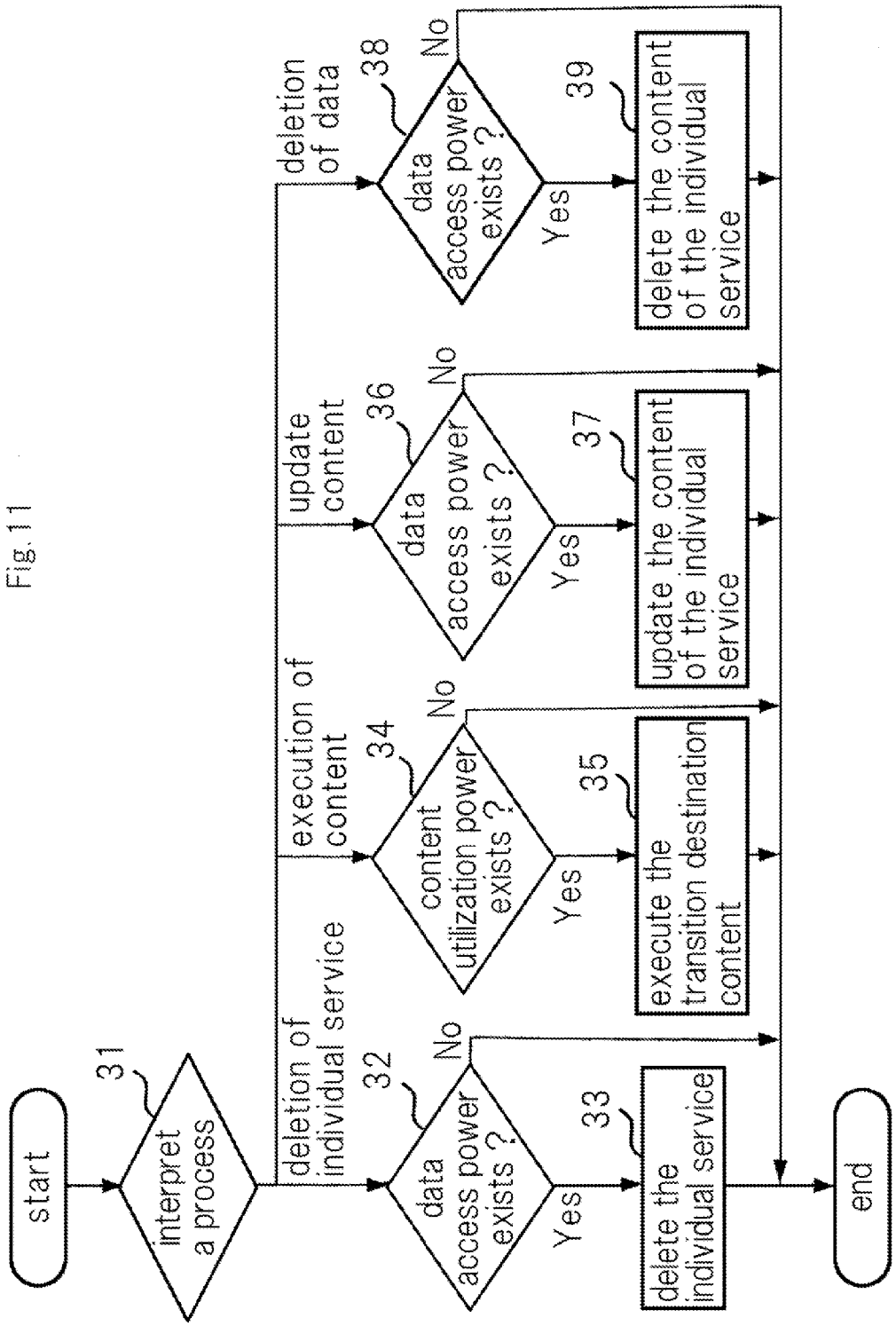

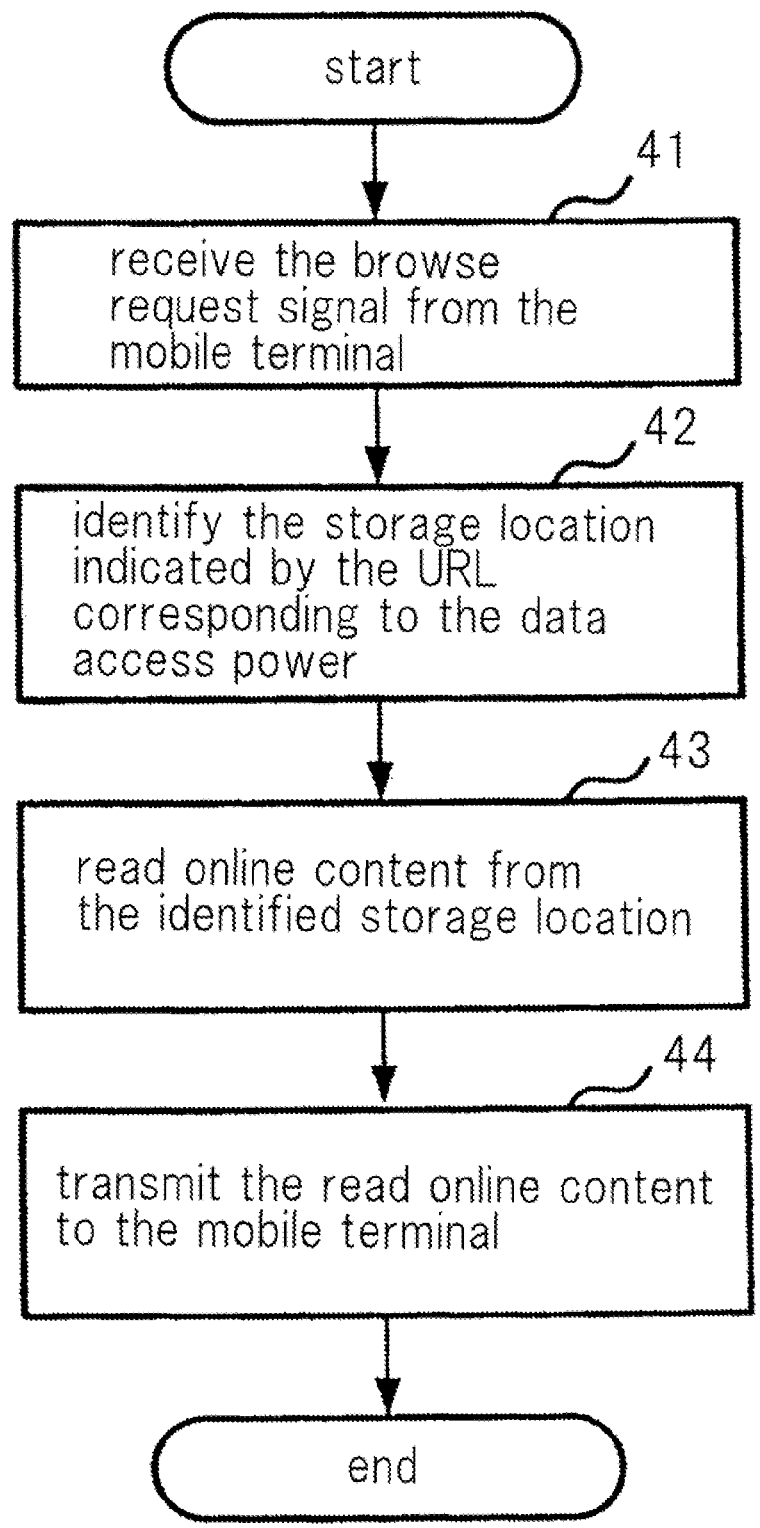

US 8,484,237 B2

TERMINAL, WEB APPLICATION OPERATING METHOD AND PROGRAM

TECHNICAL FIELD

The present invention relates to a terminal, a web application operating method and a program therefor.

BACKGROUND ART

In recent years, web application systems, in which content that is stored in a web server is accessed from mobile terminals, have become widespread.

In such a web application system, as an access scheme in which a mobile terminal accesses content that is stored in a web server, there is an access scheme in which a browser that is activated by a mobile terminal accesses content that is stored in the web server.

According to this access scheme, upon accessing to content in the web server, a browser on the mobile terminal stores the content in a cache area in the mobile terminal. After completion of access, when the same content is accessed from the mobile terminal the next time, the content that is stored in the cache area will be accessed, thereby obviating the need of connecting to the web server. However, according to such a general access scheme, one cannot access the content in the cache area or delete the content using an application that provides a variety of services on the mobile terminal.

A variety of techniques have been devised that improves the versatility when an application on a mobile terminal utilizes content that is stored in a cache area.

For example, JP2001-184472A and JP2004-086890A disclose a technique wherein content (script) that executes a process common to a plurality of applications (for example games) is stored in a cache area of an IC card, and only scripts that execute processes that differ among the plurality of applications are replaced each other, thereby eliminating complicated processing at the time of interchanging applications in the cache area.

According to a commonly-used technique, when one accesses content in a web server from the browser on a mobile terminal, the content is stored in a cache area in the mobile terminal. However, demands for downsizing and weight reduction of mobile terminals impose restrictions on the capacity of memory that is provided in the mobile terminal.

Furthermore, according to the commonly-used technique, when an application is activated on a mobile terminal, the application cannot recognize the state of storage of content in a cache area in the mobile terminal, that is, cannot confirm the presence or absence of content that was stored in the cache area prior to the activation thereof, that was stored in the cache area after the activation, and that belongs to other applications. Thus, the commonly-used technique is problematic in that content that is stored in the cache area cannot be designated by other content for deletion.

Still furthermore, the technique disclosed in JP2001-184472A and JP2004-086890A poses a problem wherein it cannot perform control such that, from among a plurality of applications, only a specific application is allowed to add content that constitutes a game stored in the cache area, to delete and to update the content.

DISCLOSURE OF THE INVENTION

It is an object of the present invention to provide a web application system, a terminal, a web application operating method and a program therefor that remedy the aforementioned problems.

To solve the aforementioned problems, according to the present invention, there is provided a terminal connected with a server for distributing content that constitutes a predetermined service and that contains a statement indicative of arbitrary processing to be executed, the terminal comprising: a storage section that stores content distributed from the server and a data access power for deleting a service that differs from a service to which the content belongs, in association with each other; a power determination section that determines, when the content that is stored in the storage section requests the deletion of a differing service that is indicated by a statement contained in the content, whether or not the content and the data access power are stored in the storage section in association with each other; and a service deletion section that, when the determination section has determined that the content that requested the deletion of the differing service and the data access power are stored in the storage section in association with each other, deletes content that belongs to the differing service from the storage section.

To solve the aforementioned problems, according to the present invention, there is provided a web application operating method in a terminal connected with a server for distributing content that constitutes a predetermined service and that contains a statement indicative of arbitrary processing to be executed, the method comprising: a storage process wherein said terminal stores content distributed from said server and a data access power for deleting a service that differs from a service to which said content belongs, in association with each other; a power determination process wherein, when the content that is stored requests the deletion of a differing service that is indicated by the statement contained in the content, the terminal determines whether or not the content and the data access power are stored in association with each other by the storage process; and a service deletion process wherein, when it is determined in the power determination process that the content that requested the deletion of the differing service and the data access power are stored in association with each other by the storage process, the terminal deletes content that belongs to the differing service.

According to the present invention, there is provided a program for causing a terminal connected with a server for distributing content that constitutes a predetermined service and that contains a statement indicative of arbitrary processing to be executed, to perform: a storage procedure for storing content distributed from said server and a data access power for deleting a service that differs from a service to which said content belongs, in association with each other; a power determination procedure for determining, when the content that is stored requests the deletion of a differing service that is indicated by the statement contained in the content, whether or not the content and the data access power are stored in association with each other by the storage procedure; and a service deletion procedure for, when said power determination procedure has determined that the content that requested the deletion of the differing service and the data access power are stored in association with each other by the storage procedure, deleting content that belongs to the differing service.

According to the present invention, in a terminal connected with a server for distributing content that constitutes a predetermined service and that contains one or more statements representative of arbitrary processing to be executed, the terminal stores content distributed from the server and a data access power for deleting services that differ from a service to which the content belongs in association with each other; the terminal determines, when the stored content requests the deletion of the differing services that is indicated by the statement contained in the content, whether or not the content and the data access power are stored in the terminal in association with each other; and when the terminal has determined that the content that requested the deletion of the differing service and the data access power are stored in the terminal in association with each other, the terminal deletes content that belongs to the differing services from the terminal. Therefore, applications, which provide differing services, each prevent update or deletion of content that belong to its own service from being executed by other content that is not permitted by the application.

BRIEF DESCRIPTION OF THE DRAWINGS

FIG. 6a is a diagram showing an example of the data structure of service provider registration power information shown in FIG. 5.

FIG. 6b is a diagram showing an example of the data structure of service registration power information shown in FIG. 5.

FIG. 11 is a flow chart showing an operation in which the mobile terminal performs a variety of processes depending on the content of a statement of local content.

FIG. 12 is a flow chart showing an operation in which the web server transmits online content to the mobile terminal.

BEST MODE FOR CARRYING OUT THE INVENTION

A web application system (including a terminal, a web application operating method, and a program therefor) according to an exemplary embodiment of the present invention will be hereinafter described.

First, the general configuration of the web application system of the present invention will be described.

Figure 1:
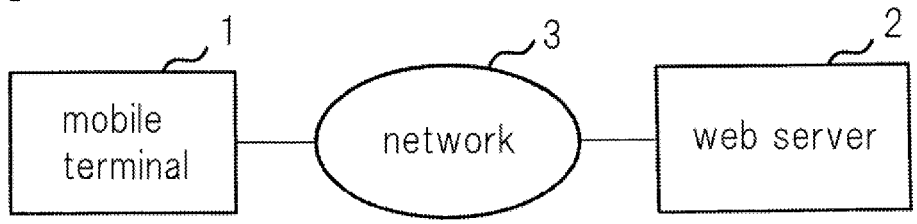
FIG. 1 is a diagram showing the configuration of a web application system according to an exemplary embodiment of the present invention.

As shown in FIG. 1, the web application system comprises mobile terminal 1, web server 2, and network 3.

Mobile terminal 1 is a terminal that is constituted by a mobile electronic device, for example, and receives content from web server 2.

Mobile terminal 1 also stores content distributed from web server 2 in cache area 111A of storage section 111, later described, of the terminal.

Content that is received from web server 2 is intended for providing a predetermined service (for example, individual services SV-1~SV-N, later described). The number of content items that constitute the service is one or more.

Content is described using a tag language such as, for example, HTML, and contains a "statement" indicative of an arbitrary processing to be executed.

Content may contain a "statement" only for displaying a screen, for example.

Content may also be a script that contains a "statement" for performing an operation with additional data such as, for example, variables retained therein.

Content may also contain a statement indicative of processing that executes other content.

When content (transition source content) is executed which contains a statement indicative of the execution of other content (transition destination content), if the transition source content is invested with power (content utilization power PR3, later described) to permit the transition source content to execute the other content, then the transition source content executes the other content. If the transition source content is not invested with the power to permit the transition source content to execute the other content, then it is treated as an error.

Now, assume that content that is stored in mobile terminal 1 or content that is stored in web server 2 requests, during its execution, mobile terminal 1 (content write section 102, service deletion section 103, content update section 104, content deletion section 105, and content execution section 109, later described) to execute an arbitrary process that is indicated by a statement included in the content.

Applications on mobile terminal 1 can execute content on web server 2 or content that is previously stored in mobile terminal 1. A plurality of services that are constituted by these items of content and are provided can be registered.

In the following, a business operator that provides a management service for managing all of the services in mobile terminal 1 is called "a primary service provider", and a service that is provided by the primary service provider is called "a primary service SV-P".

The a primary service SV-P is invested with power to provide service provider registration power PR1, later described.

The primary service SV-P is further invested with service provider registration power PR1 and service registration power PR2 by service provider registration section 101A, later described.

Business operators that provide respective individual service SV-1 to SV-N under the primary service provider's management are called an "individual service provider".

Individual services SV-1 to SV-N include various services that use, for example, tickets, membership cards, coupons, reward cards etc. The number N, which is the number of individual services SV-1 to SV-N, is arbitrary.

When individual services SV-1 to SV-N constituted by the content received from web server 2 are added to mobile terminal 1, the primary service SV-P needs to be added to mobile terminal 1 in advance. Use of primary service SV-P allows mobile terminal 1 to add therein individual services SV-1 to SV-N from web server 2.

Accordingly, by way of example, a description is given of a case in which mobile terminal 1 accesses web server 2 to receive primary service SV-P therefrom.

Online content OC on web server 2 that mobile terminal 1 first accesses when it receives primary service SV-P from web server 2 is also content that the primary service provider provides.

Figure 2:
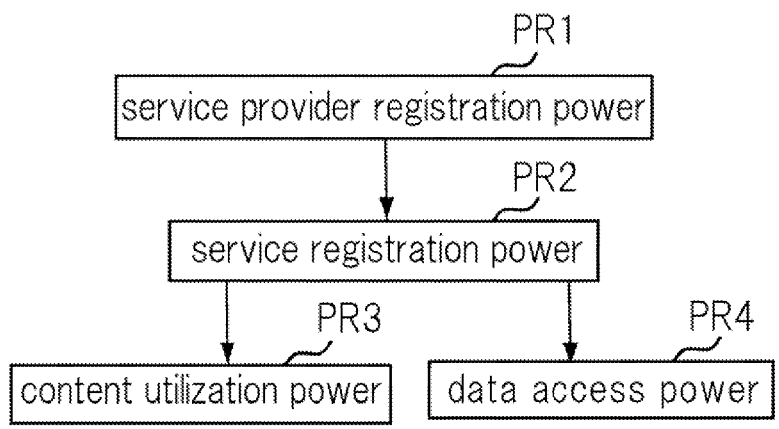
FIG. 2 is a diagram showing a hierarchy of powers that are invested by a power investment section.

In the web application system according to the present invention, powers (service provider registration power PR1, service registration power PR2, content utilization power PR3, and data access power PR4) that permit content distributed from web server 2 to execute predetermined processes are defined as shown in FIG. 2.

"Service provider registration power PR1" is a power to permit the execution of registration of individual service providers.

Service provider registration power PR1 can be set to content that belongs to primary service SV-P.

Setting of service provider registration power PR1 by the primary service provider corresponds to a further setting of the primary service provider.

"Service registration power PR2" is a power to permit the execution of registration of individual services SV-1 to SV-N.

Service registration power PR2 can be set to content that is invested with service provider registration power PR1 and that belongs to individual services SV-1 to SV-N.

"Content utilization power PR3" is a power to permit the execution of content (which include scripts).

Content utilization power PR3 can be set to content that is invested with service registration power PR2 and that belongs to individual services SV-1 to SV-N.

Data access power PR4 is a power to permit reading and writing (update) operations of various data that belong to individual services SV-1 to SV-N.

Various data that belong to individual services SV-1 to SV-N, as used herein, refer to service configuration content that constitutes the respective individual service SV-1 to SV-N, service utilization data DS-1 to DS-N that are utilized when the respective individual service SV-1 to SV-N are provided, etc.

Data access power PR4 is a power to permit the deletion of all or part of content that belongs to individual service SV-1 to SV-N. That is, data access power PR4 allows the deletion of content on an individual service basis. Stated another way, it is possible to delete individual service SV-1 to SV-N individually.

Data access power PR4 can be set to content that is invested with service registration power PR2 and that belongs to individual services SV-1 to SV-N.

During the execution of content that belongs to individual services SV-1 to SV-N, mobile terminal 1 invests the content with powers (at least one of the powers consisting of service provider registration power PR1, service registration power PR2, content utilization power PR3, and data access power PR4).

Prior to the execution of an arbitrary process that is indicated by a statement in the content, mobile terminal 1 determines whether or not the content is invested with a power necessary for the execution of the process.

When it determines that the content is invested with a power necessary for the execution of the process, mobile terminal 1 executes the arbitrary process in accordance with the statement in the content.

Figure 3:
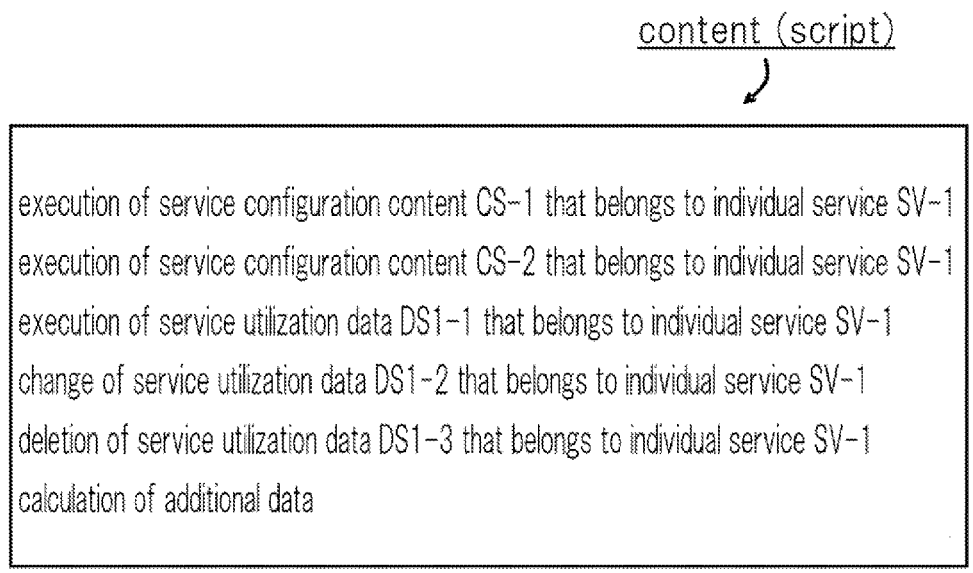
FIG. 3 is a diagram showing an example of processes indicated by a statement of content (script).

An arbitrary process indicated by a statement in the content, as used herein, refers to a process, for example, shown in FIG. 3, i.e., registration of a service, deletion of a service, execution of content that belongs to another individual service, change or deletion of content, calculation of additional data, etc.

Web server 2 shown in FIG. 1 is a server that stores content. Content that is stored in web server 2 is hereinafter referred to as "online content OC".

Upon receipt of a browse request signal from mobile terminal 1, web server 2 permits access to online content OC. Web server 2 then transmits online content OC to mobile terminal 1.

Network 3 interconnects mobile terminal 1 and web server 2 so that transmission and reception of arbitrary data between mobile terminal 1 and web server 2 are made possible. Network 3 may employ either a wired communication method or a wireless communication method.

Next, the configurations of mobile terminal 1 and web server 2 will be described in detail.

First, the configuration of mobile terminal 1 will be described in detail.

Figure 4:
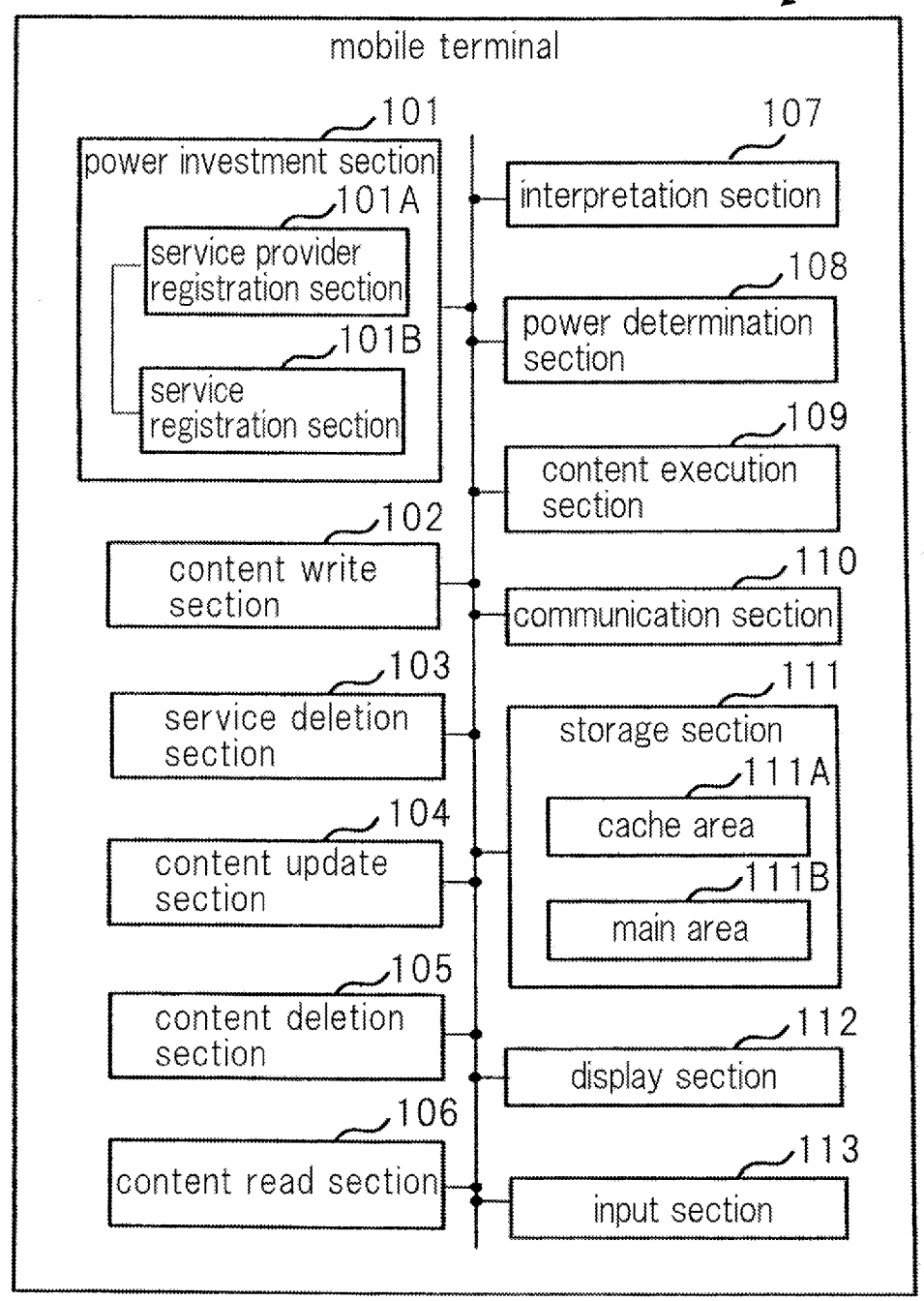
FIG. 4 is a diagram showing the configuration of a mobile terminal shown in FIG. 1.

As shown in FIG. 4, mobile terminal 4 comprises power investment section 101, content write section 102, service deletion section 103, content update section 104, content deletion section 105, content read section 106, interpretation section 107, power determination section 108, content execution section 109, communication section 110, storage section 111, display section 112, and input section 113.

Power investment section 101 invests four powers for executing predetermined processes when content is executed: service provider registration power PR1, service registration power PR2, content utilization power PR3, and data access power PR4.

Power investment section 101 comprises service provider registration section 101A and service registration section 101B.

Service provider registration section 101A invests, at the request of the content (script) that is executed by content execution section 109, the content with service provider registration power PR1.

When it invests the content with service provider registration power PR1, service provider registration section 101A registers the individual service invested with service provider registration power PR1 in service provider registration power information IF1.

Thus, service provider registration power information IF1 is information in which individual services SV-1 to SV-N that are invested with service provider registration power PR1 are registered. The data structure of service provider registration power information IF1 is not particularly limited. For example, it may be a data structure in which service provider registration power PR1 is associated with an individual service that is invested with the service provider registration power PR1. Service provider registration power information IF1 is stored in common area CA, later described, of cache area 111A.

When requested from the content that is invested with service provider registration power PR1, service provider registration section 101A can again establish service provider registration power information IF1 in common area CA.

Service provider registration section 101A also invests, at the request of the content that is invested with service provider registration power PR1 and that belongs to individual services SV-1 to SV-N, the content with service registration power PR2.

When it invests the content with service registration power PR2, service provider registration section 101A registers the individual service invested with service registration power PR2 in service registration power information IF2.

Thus, service registration power information IF2 is information in which individual services SV-1 to SV-N that are invested with service registration power PR2 are registered. The data structure of service registration power information IF2 is not particularly limited. For example, it may be a data structure in which service registration power PR2 is associated with an individual service that is invested with service registration power PR2. Service registration power information IF2 is stored in common area CA, later described, of cache area 111A.

The above-described service provider registration power PR1 and service registration power PR2 can be described, for example, as a URL (Uniform Resource Locator) indicative of a storage location (for example, a folder) in which the content that is invested with the power is stored. In the following, a case will be explained, by way of example, in which a URL can be uniquely expressed for a storage location of online content OC stored in web server 2 and for a storage location of local content LC stored in mobile terminal 1.

In this case, only content that is stored in the storage location indicated by a URL set as service provider registration power PR1 can perform setting of service registration power PR2 and re-setting of service provider registration power PR1.

Further, only content that is stored in the storage location indicated by a URL set as service registration power PR2 can perform registration (new addition) of individual services in cache area 111A.

When individual services are newly added, service registration section 101B establishes content utilization power PR3 or data access power PR4 for the execution of content that is invested with service registration power PR2 by service provider registration section 101A and that belongs to the service.

When it invests content that belongs to services to be added (primary service SV-P or individual services SV-1 to SV-N) with content utilization power PR3, service registration section 101B registers the content in content utilization power information IF3. Content utilization power information IF3 is stored in a service area that is assigned to a service to which the content belongs.

When it invests content that belongs to services to be added (primary service SV-P or individual services SV-1 to SV-N) with data access power PR4, service registration section 101B registers the content in data access power information IF4. Data access power information IF4 is stored in service area PA or SA-1 to SA-N that is assigned to a service to which the content belongs.

Content utilization power PR3 is, for example, a combination of transition destination identification information for identifying a different content (transition destination content) which is a target to be executed from other content and transition source identification information for identifying other content (transition source content) which is permitted to execute the transition destination content.

Forms of the transition destination identification information and the transition source identification information are not particularly limited. For example, the transition destination identification information may be a URL (hereinafter referred to as "transition destination URL") indicating a storage location in which the transition destination content is stored. Further, the transition source identification information may be a URL (hereinafter referred to as "transition source URL") indicating a storage location in which the transition source content is stored.

In the following, a case will be explained, by way of example, in which content utilization power PR3 has a data structure in which the transition destination URL, the transition source URL, and content utilization power PR3 are combined and are associated with each other.

Only the transition source content that is stored in the storage location indicated by the transition source URL (identification information) set in content utilization power PR3 can execute the transition destination content ("different content") that is stored in the storage location indicated by the transition destination URL.

The transition source URL as used herein may be a URL indicating the storage location of online content OC that is stored in web server 2. Further, a plurality of combinations of the transition source content and the transition destination content can be set for each of individual services SV-1 to SV-N.

When setting content that belongs to individual service SV-1 as the transition destination content, an individual service provider of individual service SV-1 sets a storage location for content that belongs to other individual services SV-2 to SV-N as the transition source URL, and also sets a storage location for the content that belongs to individual service SV-1 as the transition destination URL, using input section 113.

Data access power PR4 can be expressed as a URL. Thus, only the content that is stored in the storage location indicated by the URL set as data access power PR4 can read data from service areas SA-1 to SA-N assigned to respective individual services SV-1 to SV-N and can write data to service areas SA-1 to SA-N.

Data that are stored in service areas SA-1 to SA-N include service configuration content CS-1 to CS-N that constitute respective individual services SV-1 to SV-N, service utilization data DS-1 to DS-N (for example, images, variables, etc.) that are additional data used by respective service configuration content CS-1 to CS-N, content utilization power information IF3, and data access power information IF4.

When registering (adding) a service in storage section 111, power investment section 101 specifies a URL indicative of the storage location for the content to be invested with data access power PR4 for permitting access to the data of the service.

It is assumed that for example, "local://xxx/yyy/" is specified as a URL of mobile terminal 1, in order to specify content that is invested with data access power PR4 for permitting access to certain data.

In this case, it is possible from local content LC that resides on a storage location (for example, local://xxx/yyy/a1.xml, local://xxx/yyy/a2.xml, local://xxx/yyy/a3.xml) that is indicated by the URL to perform predetermined processes (processes such as deletion of services, update and deletion of content) that must be done after accessing data of local content LC.

It is also assumed that for example, "htto://aaa/bbb/" is specified as a URL of web server 2, in order to specify content that is invested with data access power PR4 for permitting the access to certain data.

In this case, it is possible from online content OC that resides on a storage location (for example, http://aaa/bbb/c1.xml, http://aaa/bbb/ccc/d1.xml, http://aaa/bbb/ccc/ddd/e1.xml) that is indicated by the URL to perform predetermined processes (processes such as deletion of services, update and deletion of content) that must be done after accessing data of online content OC.

Depending on the statement of a URL that is specified as data access power PR4, it is possible to invest all the content items that belong to a certain service with data access power PR4. Further, it is possible to invest part of the content items that belong to a certain service with data access power PR4.

Content write section 102 executes a "content writing process". In the content writing process, content write section 102 stores online content OC (service configuration content CS) that is received by communication section 110 from web server 2 in storage section 111 for the individual service (assume individual service SV-M) that online content OC belongs to. Thus, individual service SV-M has been added to mobile terminal 1.

At this time, content write section 102 stores service configuration content CS that constitutes individual service SV-M in service area SA-M that is assigned to individual service SV-M in cache area 111A. Content write section 102 stores online content OC in storage section 111 only when it receives a write request from the content that is invested with data access power PR4 for an individual service to which online content OC belongs.

Service deletion section 103 executes a "service deletion process" to delete individual services SV-1 to SV-N that are to be deleted, from storage section 111, in accordance with a request from content that contains a statement indicating that a service is to be deleted. That is, service deletion section 103 deletes service configuration content CS-1 to CS-N and service utilization data DS-1 to DS-N from storage section 111 for each of individual services SV-1 to SV-N.

When content that is requested to be deleted is invested with data access power PR4 for individual services SV-1 to SV-N that are subject to deletion, service deletion section 103 deletes content that belong to a service that is subject to deletion.

When individual services SV-1 to SV-N are deleted, service deletion section 103 frees service areas SA-1 to SA-N in cache area 110A that are assigned to individual services SV-1 to SV-N.

Content update section 104 executes a "content update process" to update content that is subject to update, in accordance with a request from content that contains a statement indicating that the content is subject to update. The term "update" as used herein refers to the change of content described in the content (script), for example.

When the content that has requested update is invested with data access power PR4 for the content that is subject to update, content update section 104 updates the content that is subject to update.

Content deletion section 104 deletes content that is subject to deletion from storage section 111, in accordance with a request from content that contains a statement indicating that content is to be deleted.

Content deletion section 104 executes a "content deletion process" to delete content that is subject to deletion when the content that has requested the deletion is invested with data access power PR4 for the content that is subject to deletion.

Content read section 106 reads online content OC from web server 2 when mobile terminal 1 is connected with web server 2 through communication section 110.

Content read section 106 also reads local content LC (for example, service configuration content CS-1~CS-N) stored in storage section 111. When online content OC and local content LC are specified by a URL, content read section 106 reads online content OC and local content LC from the storage location indicated by the URL.

Interpretation section 107 interprets an arbitrary process indicated by the "statement" contained in the content that content read section 106 has read from storage section 111, that is, an arbitrary process, whose execution is requested from the content.

Interpretation section 107 determines, based on the interpretation, whether or not the arbitrary process, whose execution is requested from the content, is identical with a "predetermined process", whose execution is permitted by a "power" (any of service provider registration power PR1, service registration power PR2, content utilization power PR3 and data access power PR4) that is invested by service investment section 101

When interpretation section 107 has determined that the process indicated by the "statement" of the content that content read section 106 has read, is identical with the predetermined process, whose execution is permitted by "power", power determination section 108 executes a "power determination process".

That is, power determination section 108 determines whether or not the content that content read section 106 has read is invested with a "power" for executing the predetermined process (service provider registration power PR1, service registration power PR2, content utilization power PR3, and data access power PR4).

For example, by referring to service provider registration power information IF1 stored in common area CA, power determination section 108 determines whether or not the content is invested with service provider registration power PR1.

Further, for example, by referring to service registration power information IF2 stored in common area CA, power determination section 108 determines whether or not the content is invested with service registration power PR2.

Furthermore, for example, by referring to content utilization power information IF3-1~IF3-N stored in respective service areas SA-1~SA-N, power determination section 108 determines whether or not the content that has requested the execution of content that belongs to a different service and content utilization power PR3 are stored in storage section 111 with the content associated with content utilization power PR3, that is, whether or not the content that has requested the execution of content that belongs to a different service is invested with content utilization power PR3.

Power determination section 108 refers to the transition source URL and the transition destination URL, and determines that the content that resides in the storage location indicated by the transition source URL is permitted to execute the content that resides in the storage location indicated by the transition destination URL.

Furthermore, for example, by referring to data access power information IF4-1~IF4-N stored in respective service areas SA-1~SA-N, power determination section 108 determines whether or not the content that has requested access to data and data access power PR4 are stored in storage section 111 with the content associated with data access power PR4, that is, whether or not the content that has requested access to data is invested with data access power PR4.

When power determination section 108 determines that the content is invested with content utilization power PR3 and data access power PR4 which are necessary for the execution of the content, content execution section 109 executes a "content execution process" to execute a variety of processes in accordance with the "statement" of the content that is currently executed by content execution section 109.

The processes to be executed by content execution section 109 include, for example, a process to store additional data such as, for example, variables, a process to output the result of execution of the content to display section 112 and etc.

When power determination section 108 determines that the content is not invested with content utilization power PR3 and data access power PR4, content execution section 109 may execute a predetermined power error reaction process.

Power investment section 101, content write section 102, service deletion section 103, content update section 104, and content deletion section 105 each execute their own process while content read section 106 and content execution section 109 execute a series of processes.

Accordingly, for processes other than those executed by power investment section 101, content write section 102, service deletion section 103, content update section 104, and content deletion section 105, power determination section 108 may determine the presence or absence of a power depending on the result of the interpretation by interpretation section 107. When it is determined that the content is invested with a power, content execution section 109 can perform a process in accordance with the content of a statement of the content that is subject to execution.

Communication section 110 is constituted, for example, by a communication module, and communicates arbitrary information between mobile terminal 1 and web server 2 by connecting them to each other for communication.

For example, communication section 110 transmits to web server 2 a browse request signal to request the server to permit browsing of online content OC stored in web server 2.

Further, for example, communication section 110 receives online content OC to which access is permitted from web server 2 in response to the browse request signal.

Storage section 111 is, for example, constituted by a memory module, and executes a "storage process" to store arbitrary information Storage section 111 includes two storage areas: cache area 111A and main area 111B.

Cache area 111A is provided so that content read section 106 can quickly read data that are likely to be read with a high frequency (for example, online content OC received by communication section 110 from web server 2), from among data that are stored in storage section 111. In this illustrative example, a description will be given of a case where cache area 111A is a cache memory module that can be read more quickly, that is, can be accessed at a higher speed than a memory module that constitutes main area 111B.

The configuration of cache area 111A will now be described.

Figure 5:
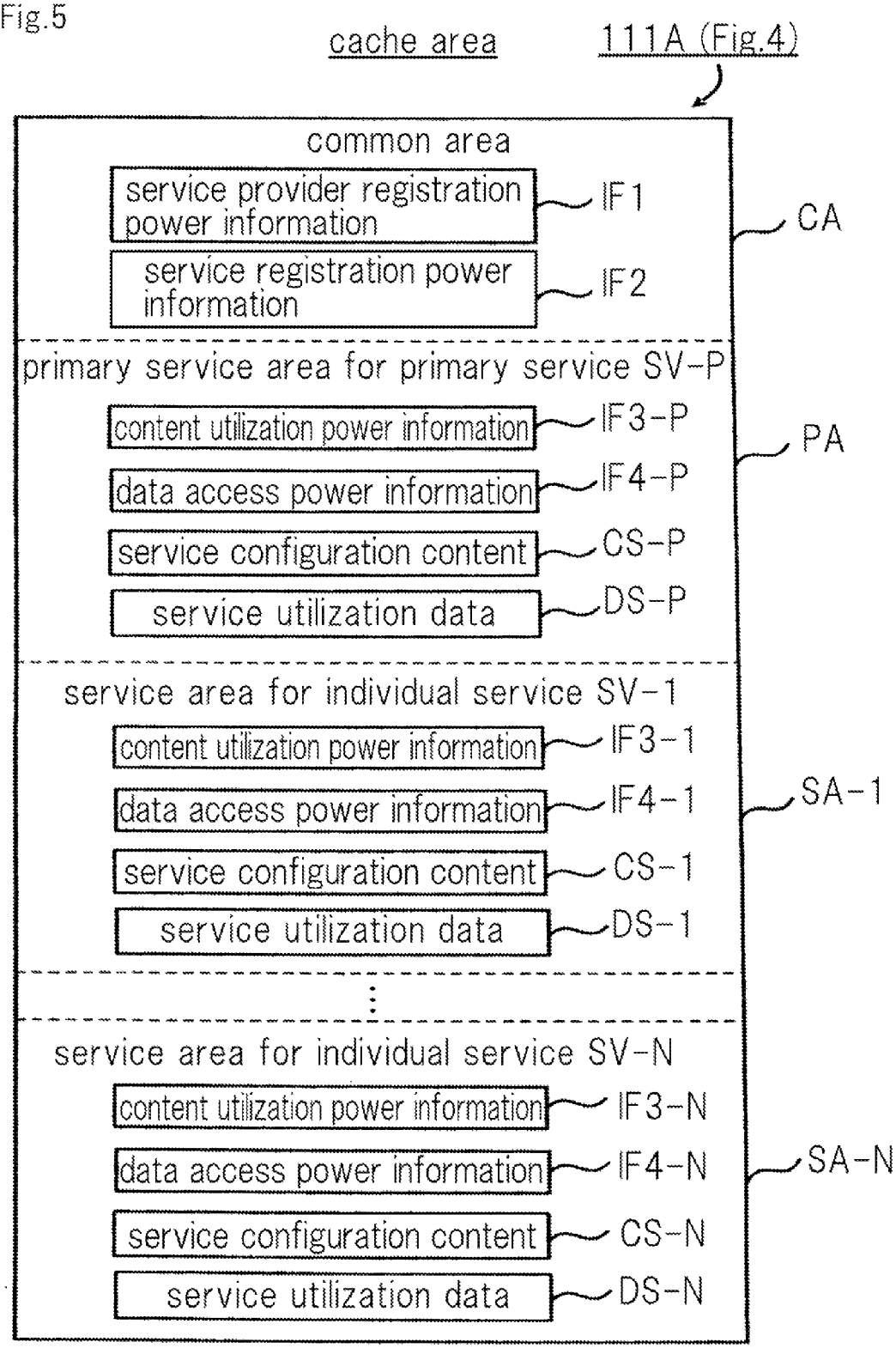
FIG. 5 is a diagram showing the configuration of a cache area shown in FIG. 4.

As shown in FIG. 5, cache area 111A includes common area CA, primary service area PA which is a service area for a primary service provider, individual service areas SA-1~SA-N which are service areas assigned to respective individual services SV-1~SV-N.

Common area CA stores service provider registration power information IF1 and service registration power information IF2.

As shown in FIG. 6a, service provider registration power information IF1 is information indicative of the content that is invested with service provider registration power PR1.

As shown in FIG. 6b, service registration power information IF2 is information indicative of the content that is invested with service registration power PR2.

Service provider registration section 101A can change service provider registration power information IF1 and service registration power information IF2.

Primary service area PA is an area into which are stored a variety of data related to primary service SV-P that is provided by the primary service provider.

For example, primary service area PA stores content utilization power information IF3-P, data access power information IF4-P, service content configuration content CS-P, and service utilization data DS-P.

Content utilization power information IF3-P is information indicative of the content that is invested with content utilization power PR3 for utilizing content that belongs to primary service SV-P.

Data access power information IF4-P is information indicative of the content that is invested with data access power PR4 for utilizing data that are used in content that belongs to primary service SV-P.

Service content configuration content CS-P is one or more items of content that constitute primary service SV-P.

Service utilization data DS-P is arbitrary data (for example, variables, the result of execution) which, when content execution section 109 executes content that belongs to primary service SV-P, are generated during the execution.

Individual service areas SA-1~SA-N are areas into which data related to respective individual services SV-1~SV-N are stored. Data that are stored in respective individual service areas SA-1~SA-N have the same data structure. Therefore, in the following, a description will be given of individual service area SA-1 that stores data related to individual service SV-1.

Individual service area SA-1 stores content utilization power information IF3-1, data access power information IF4-1, service configuration content CS-1, and service utilization data DS-1.

Content utilization power information IF3-1 is information indicative of the content that is invested with content utilization power PR3 for utilizing content that belongs to individual service SV-1.

Figure 7A:
FIG. 7a is a diagram showing an example of the data structure of content utilization power information shown in FIG. 5.

As shown in FIG. 7a, content utilization power information IF3-1 is information that brings transition destination URL (transition destination identification information) indicative of a storage location of transition destination content that is subject to execution, into correspondence with transition source URL (transition source identification information) indicative of a storage location of transition source content that permits the execution of the transition destination content. A plurality of sets of the transition destination URL and transition source URL can be set.

Figure 7B:
FIG. 7b is a diagram showing an example of the data structure of data access power information shown in FIG. 5.

As shown in FIG. 7b, data access power information IF4-1 is information indicative of the content that is invested with data access power PR4 for utilizing data used in content that belongs to individual service SV-1.

In the example of FIG. 7b, in addition to the content itself that belongs to individual service SV-1, content that belongs to individual services SV-2, SV-3 and SV-N can read and write data that belong to individual service SV-1.

Service content configuration content CS-1 is one or more items of content that constitute individual service SV-1.

Service utilization data DS-1 is arbitrary data (for example, variables, the result of execution) which, when content execution section 109 executes content that belongs to primary service SV-1, are generated during the execution.

Main area 111B shown in FIG. 4 stores arbitrary data other than data (for example, online content OC and local content LC) that is to be stored in cache area 111A Display section 112 is constituted, for example, by an LCD (Liquid Crystal Display) panel, and displays arbitrary data. For example, display section 112 displays the result of execution of content that is delivered from content execution section 109.

Input section 113 receives an input of information that depends on an operation performed by the user. For example, input section 113 is used for the user to instruct the execution of content (scripts) that belongs to individual services SV-1~SV-N. Also, for example, input section 113 is used for an individual service provider to newly add a transition source URL (content, access to which is permitted) to content utilization power information IF3 for the individual service of the provider.

Next, the configuration of web server 2 will be described in detail.

Figure 8:
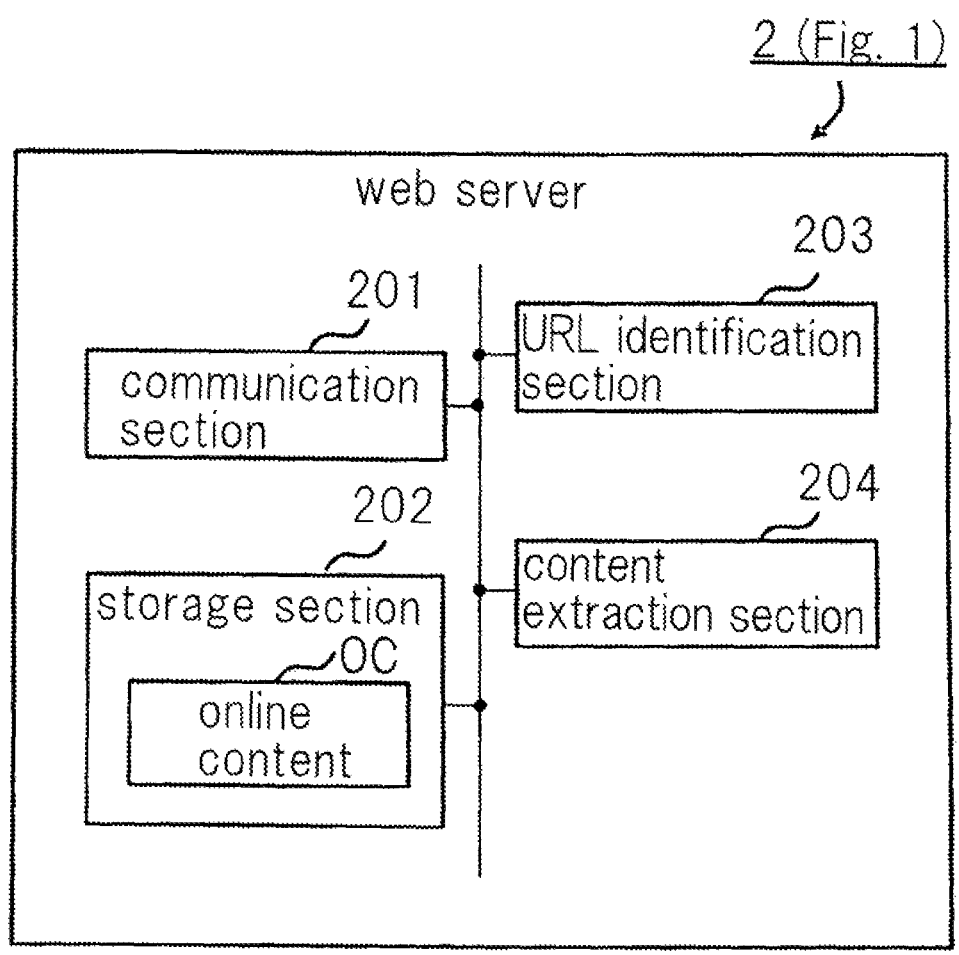
FIG. 8 is a diagram showing the configuration of a web server shown in FIG. 1.

As shown in FIG. 8, web server 2 comprises communication section 201, storage section 202, URL identification section 203, and content extraction section 204.

Communication section 201 is constituted, for example, by a communication module, and communicates arbitrary information between mobile terminal 1 and web server 2.

For example, communication section 201 receives a browse request signal from mobile terminal 1.

Further, for example, communication section 201 transmits to mobile terminal 1 online content OC that is read from storage section 202 by content extraction section 204.

Storage section 202 stores arbitrary data. For example, storage section 202 stores online content OC.

Storage section 202 stores online content OC in a storage location (for example, a folder) that is identified by a URL.

URL identification section 203 identifies, from within storage section 202, a storage location indicated by the browse request signal transmitted from mobile terminal 1.

Content extraction section 204 reads online content OC (for example, service configuration content CS) that is stored in the storage location identified by URL identification section 203.

Next, a description will be given of an operation of the web application management system having the aforementioned configuration when mobile terminal 1 performs various processes related to content First, a description will be given of an operation in which online content OC (service configuration content CS) that constitutes primary service SV-P is received from web server 2, and primary service SV-P that is provided by the received online content OC is added to mobile terminal 1.

Figure 9:
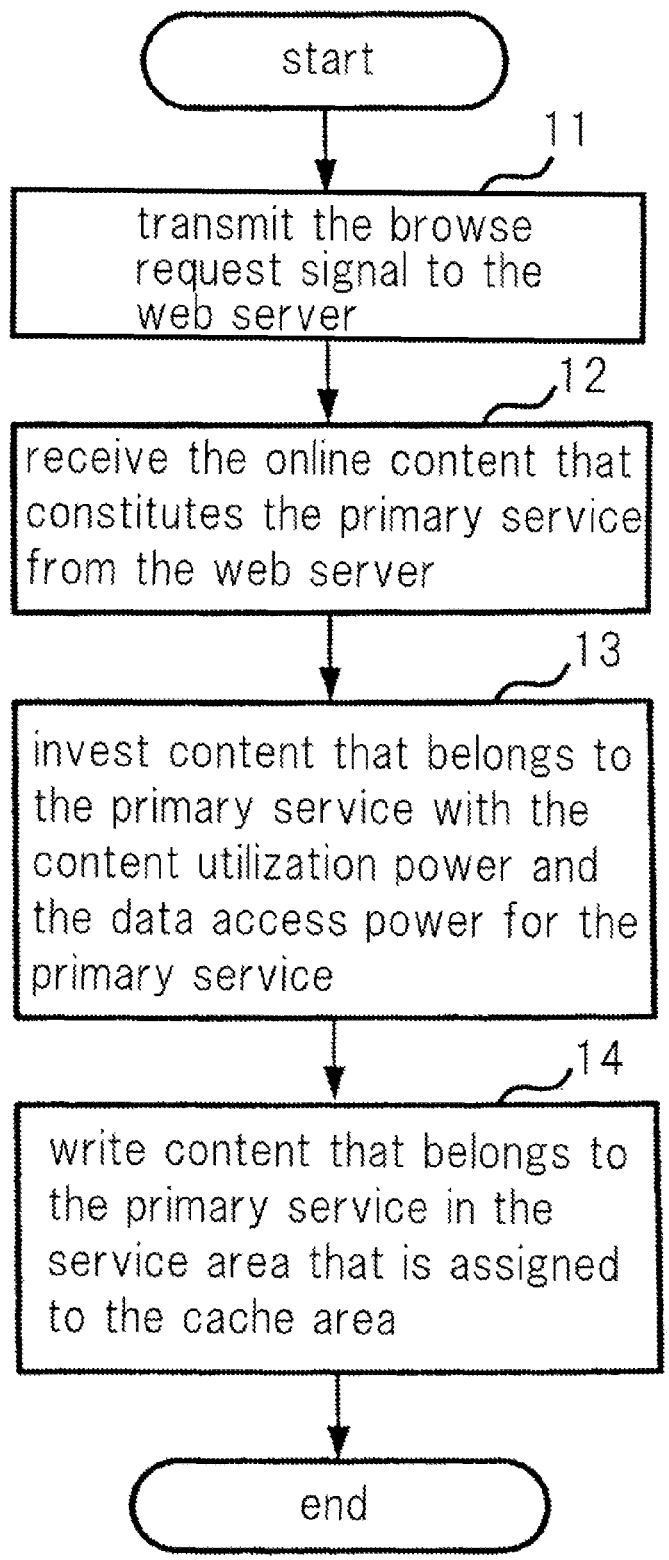
FIG. 9 is a flow chart showing an operation in which the mobile terminal adds a primary service to the cache area.

As shown in FIG. 9, communication section 110 transmits the browse request signal to web server 2 at step 11. Then, communication section 110 accesses the content that is provided by the primary service provider in web server 2. This content is invested with service provider registration power PR1 and service registration power PR2.

Subsequently, communication section 110 receives service configuration content CS of primary service SV-P from web server 2 at step 12.

Thereafter, at step 13, service registration section 101B invests the content that constitutes primary service SV-P received by communication section 110 with content utilization power PR3 and data access power PR4 for primary service SV-P.

At this time, service registration section 101B registers content that is invested with content utilization power PR3 or data access power PR4 in content utilization power information IF3-P or data access power information IF4-P in service area PA shown in FIG. 5.

Further, at step 14, content write section 102 writes service configuration content CS from web server 2 that constitutes primary service SV-P in primary service area PA that is assigned to primary service SV-P.

Service forms of primary service SV-P that is received by mobile terminal 1 from web server 2 is not particularly limited.

For example, primary service SV-P may be of a service form in which a list of individual services SV-1 to SV-N registered in the web application system of the present invention is displayed by display section 112, an individual service that is desired by the user is specified from the list through input section 113, and the specified individual service is executed.

Alternately, primary service SV-P may be of a service form in which individual services stored in cache area 111A are deleted.

Further, primary service SV-P may be of a service form in which individual services provided by the individual service provider are newly added to cache area 111A. Specifically, service registration section 101B establishes content utilization power PR3 and data access power PR4 for the individual service, and content write section 102 writes content that belongs to individual service SV in service area SA that is assigned to individual service SV.

After primary service SV-P is added to mobile terminal 1, power determination section 108 determines whether or not the content is invested with service provider registration power PR1. Service provider registration section 101A sets service registration power PR2 and again sets service provider registration power PR1 to the content alone that has been determined by power determination section 108 to have been invested with service provider registration power PR1

The operation of adding primary service SV-P to mobile terminal 1 is thus completed.

Next, a description will be given of an operation in which mobile terminal 1 newly adds an individual service (in this example, assume individual service SV-M) thereto.

As a premise of explanation, assume that communication section 110 in mobile terminal 1 has already received, from web server 2, an application (primary service SV-P) that is necessary for the reception of online content OC from web server 2

When individual service SV-M is newly added, the application (primary service SV-P) is activated by mobile terminal 1.

Figure 10:
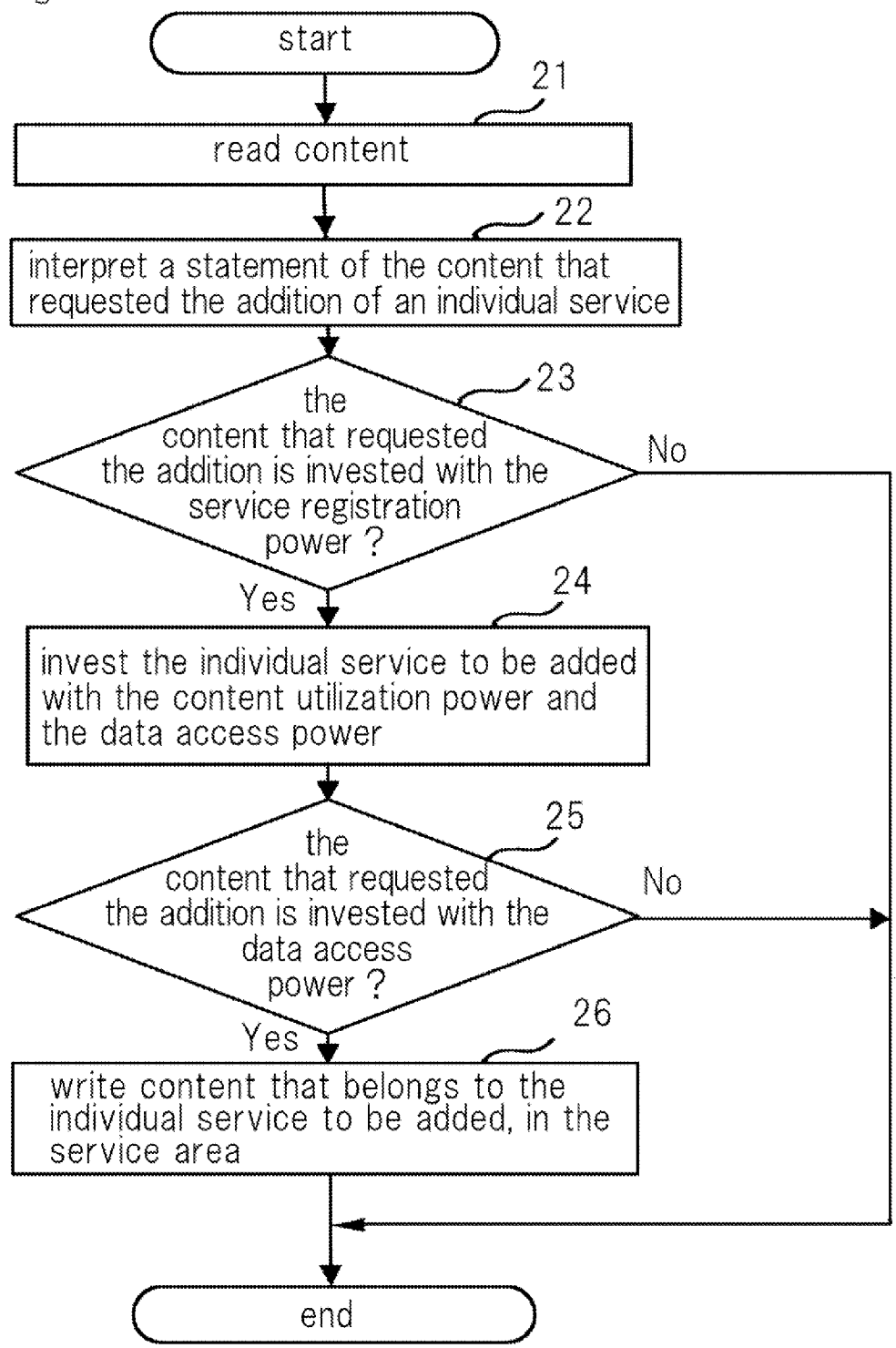
FIG. 10 is a flow chart showing an operation in which the mobile terminal adds an individual service to the cache area.

After the application is activated, as shown in FIG. 10, content read section 106 reads online content OC (service configuration content CS-M that constitutes individual service SV-M that is subject to addition) in web server 2 at step 21.

At step 22, interpretation section 107 interprets a process indicated by a statement of online content OC that is read by content read section 106, that is, an arbitrary process whose execution is requested from online content OC. In this example, interpretation section 107 interprets that a process for adding individual service SV-M has been requested. The interpreted process (addition of the individual service) is identical with a "predetermined process" (addition of a service) whose execution is permitted through service registration power RP2 that is invested by power investment section 101.

When adding individual service SV-M, service registration section 101B can set content utilization power PR3 and data access power PR4 to individual service SV-M that is subject to addition, only when the content that requested the addition (i.e., content that contains a "statement" indicative of addition) is invested with service registration power PR2.

To this end, at step 23, power determination section 108 determines whether or not the content that has requested the addition of individual service SV-M is registered in service registration power information IF2.

When the content that has requested the addition of individual service SV-M is registered in service registration power information IF2 as exemplified in FIG. 6b, power determination section 108 determines that the content that has requested the addition is invested with service registration power PR2.

In this case, at step 24, service registration section 101B sets content utilization power PR3 and data access power PR4 to content that belongs to individual service SV-M that is to be newly added to mobile terminal 1.

Content write section 102 can store in storage section 111, among content that belongs to individual service SV-M that is subject to addition, only content that is invested with data access power PR4 for individual service SV-M.

For this reason, at step 25, power determination section 108 determines whether or not the content that has requested the addition of individual service SV-M is registered in data access power information IF4-M in service area SA-M assigned to individual service SV-M that is subject to addition.

When the content that has requested the addition of individual service is registered in data access power information IF4-M in service area SA-M assigned to individual service SV-M that is subject to addition, power determination section 108 determines that the content that has requested the addition is invested with data access power PR4 for individual service SV-M that is subject to addition.

In this case, at step 26, content write section 102 writes service configuration content that constitutes individual service SV-M that is subject to addition and that is invested with content utilization power PR3 and data access power PR4 by service registration section 101B, in service area SA-M assigned to individual service SV-M that is subject to addition, within cache area 111A.

Thus, a series of operations that are performed when mobile terminal 1 newly adds individual service SV-M are completed.

When local content OC that is stored in main area 111B in storage section 111 is added as an individual service in cache area 111A, content read section 106 may read local content LC from main area 111B at step 21 shown in FIG. 10, and operations at and after step 22 may be performed for local content LC that is read by content read section 106.

Next, a description will be given of an operation in which mobile terminal 1 executes content that belongs to individual service SV-1 that is stored in cache area 111A in the web application management system having the aforementioned configuration.

The content that requests the execution of content that belongs to individual service SV-1 may be either local content LC in mobile terminal 1 or online content OC in web server 2. In the illustrative example, assume that the content is local content LC (individual services other than individual service SV-1). Then, content read section 106 reads local content LC stored in storage section 111.

As shown in FIG. 11, at step 31, interpretation section 107 interprets a process indicated by a statement in local content LC (a script) that is read by content read section 106.

When a statement indicative of the execution of the deletion process shows "DELETE", for example, at step 31, then interpretation section 107 searches the content under execution for the character "DELETE". When the character "DELETE" is found by the search, interpretation section 107 interprets the process as deletion.

First, a description will be given of an operation of the present exemplary embodiment wherein interpretation section 107 has interpreted an arbitrary process indicated by the statement of local content LC as "deletion of individual service SV-1".

When individual service SV-1 that is subject to deletion is deleted, local content LC that has requested the deletion needs to be invested with data access power PR4 for individual service SV-1.

To this end, at step 32, power determination section 108 sees data access power information IF4-1 in service area SA-1 for individual service SV-1 to determine whether or not local content LC that has requested the deletion of individual service SV-1 is invested with data access power PR4 that is necessary for the execution of deletion of individual service SV-1.

When power determination section 108 has determined that local content LC that has requested the deletion is invested with data access power PR4 that is necessary for the execution of the deletion, then service deletion section 103 deletes individual service SV-1 whose deletion is requested from storage section 111 at step 33.

Next, a description will be given of an operation of the present exemplary embodiment wherein interpretation section 107 has interpreted an arbitrary process indicated by the statement of local content LC as "execution of content that belong to individual service SV-1".

When content that belongs to individual service SV-1 is executed as an execution target (transition destination content), local content LC that has requested the execution needs to be invested with content utilization power PR3 for the content that belongs to individual service SV-1.

To this end, at step 34, power determination section 108 determines whether or not local content LC that has requested the execution is invested with content utilization power PR3 that is necessary for the execution of content that belongs to individual service SV-1. When local content LC that has requested the execution is stored in the storage location indicated by transition source URL (identification information) in content utilization power information IF3-1, power determination section 108 determines that local content LC is invested with content utilization power PR3 for the execution.

In this case, at step 35, content execution section 109 executes content (transition destination content) that belongs to individual service SV-1 and that is associated with local content LC in content utilization power information IF3-1. When power determination section 108 has determined that the content is not invested with content utilization power PR3, content execution section 109 may execute a predetermined power error response process.

In general, when a service is executed, one item of content is often transitioned to the other item of content (for example, a user interaction of a user due to the operation on input section 103 such as push of a link or a button). In such a case, a transition destination content read process via content read section 106 and a process via content execution section 109 are repeatedly executed.

Next, a description will be given of an operation of the present exemplary embodiment wherein interpretation section 107 has interpreted an arbitrary process indicated by the statement of local content LC as "update of content that belongs to individual service SV-1".

In this case, the interpreted process (update of content that belongs to an individual service) is identical with a predetermined process (update of content), whose execution is permitted by data access power PR4 that is invested by power investment section 101. That is, when content that belongs to individual service SV-1 and is subject to update is updated, local content LC that has requested the update needs to be invested with data access power PR4 for the content of individual service SV-1.

To this end, at step 36, power determination section 108 determines whether or not the content that has requested the update of content that belongs to individual service SV-1 is invested with data access power PR4 that is necessary for the execution of update of the content that belongs to individual service SV-1.

When power determination section 108 has determined that the content that has requested the update is invested with data access power PR4 for the content that belongs to individual service SV-1 and that is subject to update, content update section 104 updates the content in storage section 111 at step 37.

Next, a description will be given of an operation of the present exemplary embodiment wherein interpretation section 107 has interpreted an arbitrary process indicated by the statement of local content LC as "deletion of content that belongs to individual service SV-1".

When content that belongs to individual service SV-1 and that is subject to deletion is deleted, local content LC that has requested the deletion needs to be invested with data access power PR4 for the content that belong to individual service SV-1.

To this end, at step 38, power determination section 108 determines whether or not local content LC that has requested the deletion of the content that belongs to individual service SV-1 is invested with data access power PR4 that is necessary for the execution of deletion of content that belongs to individual service SV-1.

When power determination section 108 has determined that local content LC that requested the deletion is invested with data access power PR4 for the content that belongs to individual service SV-1 and that is subjected to deletion, content deletion section 105 deletes the content that is subjected to deletion from service area SA-1.

Thus, an operation is completed wherein mobile terminal 1 performs the execution of content that belongs to individual service SV-1 depending on the content of a statement of local content LC.

Next, a description will be given of an operation wherein web server 2 transmits to mobile terminal 1 online content OC that constitutes individual service SV-M that is to be newly added to mobile terminal 1.

The description of such an operation holds true, for example, for the case wherein mobile terminal 1 transmits service configuration content for primary service SV-P in order to add an individual service that is constituted by online content OC from web server 2.

As shown in FIG. 12, at step 41, communication section 201 receives the browse request signal transmitted from mobile terminal 1.

At step 42, URL identification section 203 identifies a storage location indicated by a URL that is described in the browse request signal that communication section 201 received from mobile terminal 1.

At step 43, content extraction section 204 reads online content OC that is stored in the storage section that is identified by URL identification section 203.

At step 434, communication section 201 transmits to mobile terminal 1 online content OC that is read by content extraction section 204.

Thus, an operation is completed wherein web server 2 transmits online content OC to mobile terminal 1.

As explained hereinabove, in mobile terminal 1 according to the exemplary embodiment of the invention, content is invested with content utilization power PR3 (a power for permitting the execution of scripts) and data access power PR4, and when the content is executed, it is determined whether or not the content is invested with content utilization power PR3 and data access power PR4, depending on the result of interpretation by interpretation unit 107. When it is determined that the content is invested with content utilization power PR3 and data access power PR4, then the content is executed.

This makes it possible to put restrictions on content that has access to data that constitute a service stored in cache area 111A of storage section 111 of mobile terminal 1.

Accordingly, applications, which provide differing services, each prevent update or deletion of content that belongs to its own service from being executed by other content whose execution is not permitted by the application. That is, securities among the services can be assured. Further, a plurality of individual services can be collaborated with each other to constitute one service.

Furthermore, according to the present invention, when an individual service is newly added to cache area 111A, content that belongs to the individual service and that is to be added is previously invested with service registration power PR2. When a service is registered during the execution of local content LC or online content OC, it is determined whether or not local content LC or online content OC is invested with service registration power PR2. When it is determined that local content LC or online content OC is invested with service registration power PR2, then the registration of a service for the content is permitted.

This makes it possible to put restrictions on content (individual-service provider) for which individual service SV-M can be registered. Accordingly, the primary service provider that manages the all services in mobile terminal 1 can prevent unintended registration of individual service SV-M.

According to embodiment 1, only the content that is invested with service provider registration power PR1, i.e., only the content that belongs to the primary service provider can be invested with service registration power PR2. Only the content that is invested with service registration power PR2 can register services.

This makes it possible to prevent unauthorized registration of services by individual-service providers other that those set by the primary service provider Furthermore, according to the present invention, when registering services, individual service providers can establish content utilization power PR3 and data access power PR4.

Of the content that belongs to an individual service, only the content that is invested with content utilization power PR3 for the individual service can be executed.

Further, in order to read data that is retained in the individual service and to write data in the individual service, only the content that is invested with data access power PR4 for the individual service can be executed.

When service provider registration power PR1, service registration power PR2, content utilization power PR3, and data access power PR4 are each invested to execute individual service SV-1, access to service utilization data DS-2~DS-N etc. that belong to respective individual service SV-2~SV-N is permitted if it is determined that service provider registration power PR1, service registration power PR2, content utilization power PR3, and data access power PR4 are invested. As a result, securities among services can be assured.

Further, even when a plurality of individual services SV-1~SV-N are collaborated with each other to constitute one service, services that constitute the one service can be securely provided. For example, when a variety of individual services such as tickets, membership cards, coupons, reward cards etc., are stored in mobile terminal 1, a service in which individual services related to respective stores A and B are collaborated with each other can be securely provided.

The present invention can be modified without departing from the spirit of the present invention.

Service registration section 101B may invest content with powers that are provided by data access PR4 by separating them into read power for reading service utilization data DS and write power for writing service utilization data DS as independent powers.

Further, when there exist plural items of service utilization data DS which are to be invested with data access power PR4, service registration section 101B may invest each item of service utilization data DS with data access power PR4.

Furthermore, service registration section 101B may set content utilization power PR3 not only to local content LC but also to content that is executed from the outside.

For example, service registration section 101B may set content utilization power PR3 to content when Web collaboration is performed (that is, execution of content from a native browser).

Further, for example, service registration section 101B may set content utilization power PR3 to content when mail collaboration is performed (that is, execution of content from an application for electronic mail).

Furthermore, when service registration section 101B sets content utilization power PR3, the transition destination content may be not only local content LC that belongs to an individual service but also online content OC that is stored in web server 2.

In the present invention, processing in mobile terminal 1 may be such that a program for implementing its functions is recorded on a recording medium which is readable in mobile terminal 1, and the program recorded on the recording medium is read into and executed by mobile terminal 1, other than that implemented by the aforementioned dedicated hardware. The recording medium readable in mobile terminal 1 refers to HDD built in mobile terminal 1 and the like in addition to portable recording media such as floppy disk (registered trademark), magneto-optical disk, DVD, CD and the like. This program recorded on the recording medium is, for example, read by power investment section 101, content write section 102, service deletion section 103, content update section 104, content deletion section 105, content read section 106, interpretation section 107, power determination section 108, content execution section 109 contained in mobile terminal 1, so that processing similar to the aforementioned is performed under the control of power investment section 101, content write section 102, service deletion section 103, content update section 104, content deletion section 105, content read section 106, interpretation section 107, power determination section 108, and content execution section 109.

Power investment section 101, content write section 102, service deletion section 103, content update section 104, content deletion section 105, content read section 106, interpretation section 107, power determination section 108, content execution section 109 contained in mobile terminal 1 acts as a computer for executing a program read from a recording medium which has recorded thereon the program.

The above-described program may also be applicable to web server 2.

While the present invention has been described above with reference to certain embodiments, the present invention is not limited to the embodiments described above. The present invention can be modified in configuration and details in various manners which can be understood by those skilled in the art without departing from the spirit and scope of the present invention.

This application is the Nation Phase of PCT/JP2009/055341, filed Mar. 18, 2009, which claims the priority under Japanese Patent Application No. 2008-118435 filed on Apr. 30, 2010, the disclosure of which is incorporated herein by reference in its entirety.

The invention claimed is:

1. A terminal connected with a server for distributing content that constitutes a predetermined service and that contains a statement indicative of arbitrary processing to be executed, the terminal comprising:
a storage section that stores content distributed from said server and a data access power for deleting a service that differs from a service to which said content belongs, in association with each other;
a power determination section that determines, when the content stored in said storage section requests the deletion of a differing service that is indicated by a statement contained in said content, whether or not said content and the data access power are stored in said storage section in association with each other; and
a service deletion section that, when said power determination section has determined that said content that requested the deletion of the differing service and the data access power are stored in said storage section in association with each other, deletes content that belongs to the differing service from said storage section.

2. The terminal according to claim 1,
wherein said data access power contains a power for deleting content stored in said storage section or data that is used by said content, and
said terminal further comprises a content deletion section that, when said power determination section has determined that content that has requested the deletion of said content that is stored or said data and the data access power are stored in said storage section in association with each other, deletes said content or said data that is requested to be deleted from the storage section.

3. The terminal according to claim 1, wherein
said data access power contains a power for updating content stored in said storage section or data that is used by said content, and
said terminal further comprises a content update section that, when said power determination section has determined that content that requested the update of the content stored in said storage section and the data access power are stored in said storage section in association with each other, updates the content that is requested to be updated.

4. A web application operating method in a terminal connected with a server for distributing content that constitutes a predetermined service and that contains a statement indicative of arbitrary processing to be executed, the method comprising:
storing in a storage section content distributed from said server and a data access power for deleting a service that differs from a service to which said content belongs, in association with each other;
when the content that is stored in said storage section requests the deletion of a differing service that is indicated by the statement contained in said content, determining whether or not said content and the data access power are stored in said storage section in association with each other; and
when it is determined that said content that requested the deletion of the differing service and the data access power are stored in said storage section in association with each other, deleting content that belongs to the differing service.

5. The web application operation method according to claim 4, wherein
said data access power contains a power for deleting the content stored in said storage section or data that is used by said content, and
said method further comprises, when it is determined that content that has requested the deletion of the content that is stored in said storage section or said data and the data access power are stored in said storage section in association with each other, deleting said content or said data that is requested to be deleted.

6. The web application operation method according to claim 4, wherein said data access power contains a power for updating content stored in said storage section or data that is used by said content, and said method further comprises, when it is determined that content that requested the update of the content that is stored in said storage section and the data access power are stored in said storage section in association with each other, updating the content that is requested to be updated.

7. A non-transitory computer-readable recording medium storing a computer program for causing a computer in a terminal connected with a server for distributing content that constitutes a predetermined service and that contains a statement indicative of arbitrary processing to be executed, to perform:

storing in a storage section content distributed from said server and a data access power for deleting a service that differs from a service to which said content belongs, in association with each other;

determining, when the content that is stored in said storage section requests the deletion of a differing service that is indicated by the statement contained in said content, whether or not said content and the data access power are stored in said storage section in association with each other; and deleting, when it is determined that said content that requested the deletion of the differing service and the data access power are stored in said storage section in association with each other, content that belongs to the differing service.

8. The non-transitory computer-readable recording medium according to claim 7, wherein said data access power contains a power for deleting the content stored in said storage section or data that is used by said content, and said computer further performs deleting, when it is determined that content that has requested the deletion of the content that is stored to or said data and the data access power are stored in said storage section in association with each other, said content or said data that is requested to be deleted.

9. The non-transitory computer-readable recording medium according to claim 7, wherein said data access power contains a power for updating the content stored in said storage section or data that is used by said content, and said computer further performs updating, when it is determined that content that requested the update of the content that is stored and the data access power are stored in said storage section in association with each other, the content that is requested to be updated.

* * * * *